(12) United States Patent
Abd Elhamid et al.

(10) Patent No.: US 8,785,080 B2
(45) Date of Patent: Jul. 22, 2014

(54) PASSIVATED METALLIC BIPOLAR PLATES AND A METHOD FOR PRODUCING THE SAME

(75) Inventors: Mahmoud H. Abd Elhamid, Grosse Pointe Woods, MI (US); Gayatri Vyas Dadheech, Rochester Hills, MI (US); Youssef M. Mikhail, Sterling Heights, MI (US)

(73) Assignee: GM Global Technology Operations LLC, Detroit, MI (US)

(*) Notice: Subject to any disclaimer, the term of this patent is extended or adjusted under 35 U.S.C. 154(b) by 693 days.

(21) Appl. No.: 11/968,798

(22) Filed: Jan. 3, 2008

(65) Prior Publication Data

US 2009/0176139 A1    Jul. 9, 2009

(51) Int. Cl.
*H01M 8/02* (2006.01)
*H01M 8/10* (2006.01)
*H01M 8/24* (2006.01)
*C23C 14/08* (2006.01)
*C23C 14/14* (2006.01)
*B05D 5/12* (2006.01)

(52) U.S. Cl.
USPC ........... 429/535; 429/457; 429/480; 429/483; 429/514; 427/77; 204/192.15; 204/192.1

(58) Field of Classification Search
USPC ........... 429/336, 34, 44, 30, 12, 38, 492, 457, 429/480, 483, 514, 535; 29/592.1; 204/192.1, 192.15; 420/469; 423/594.1; 427/77
See application file for complete search history.

(56) References Cited

U.S. PATENT DOCUMENTS

| | | | |
|---|---|---|---|
| 3,134,689 A | 5/1964 | Pritikin et al. | |
| 4,272,353 A | 6/1981 | Lawrance et al. | |
| 6,183,717 B1* | 2/2001 | Khan | 423/594.1 |
| 6,218,326 B1* | 4/2001 | Datta et al. | 502/3 |
| 6,372,376 B1* | 4/2002 | Fronk et al. | 429/487 |
| 6,379,476 B1* | 4/2002 | Tarutani et al. | 148/325 |
| 7,214,440 B2 | 5/2007 | Utsunomiya et al. | |
| 7,247,403 B2 | 7/2007 | Brady et al. | |
| 2002/0009630 A1* | 1/2002 | Gao et al. | 429/34 |
| 2002/0081478 A1* | 6/2002 | Busenbender | 429/34 |
| 2003/0104267 A1* | 6/2003 | Haridoss et al. | 429/44 |
| 2004/0018407 A1* | 1/2004 | Barbir et al. | 429/26 |
| 2004/0058205 A1* | 3/2004 | Mantese et al. | 429/12 |
| 2004/0106032 A1* | 6/2004 | Uejima et al. | 429/34 |
| 2004/0110058 A1* | 6/2004 | Lee et al. | 429/40 |
| 2004/0197661 A1* | 10/2004 | Utsunomiya et al. | 429/247 |

(Continued)

FOREIGN PATENT DOCUMENTS

| | | | | |
|---|---|---|---|---|
| CN | 1790791 | 6/2006 | | |
| JP | 2002367622 A | * 12/2002 | | H01M 8/02 |
| WO | 2006059943 A1 | 6/2006 | | |
| WO | WO-2006/136242 A1 | * 12/2006 | | C04B 35/536 |

OTHER PUBLICATIONS

Machine Translation of JP 2002367622 A, Dec. 2002, Miyano et al.*
English Abstract of JP 2002367622 A, Dec. 2002, Miyaho et al.*

(Continued)

*Primary Examiner* — Kenneth Douyette
(74) *Attorney, Agent, or Firm* — BrooksGroup

(57) ABSTRACT

A method including providing a substrate; treating the substrate to form a passive layer, wherein the passive layer has a thickness of at least 3 nm; and
    depositing an electrically conductive coating over the substrate, wherein the coating has a thickness of about 0.1 nm to about 50 nm.

34 Claims, 3 Drawing Sheets

(56) References Cited

U.S. PATENT DOCUMENTS

| | | | |
|---|---|---|---|
| 2005/0084742 A1* | 4/2005 | Angelopoulos et al. | 429/44 |
| 2005/0100774 A1 | 5/2005 | Abd Elhamid et al. | |
| 2005/0102819 A1* | 5/2005 | Lee et al. | 29/592.1 |
| 2005/0238873 A1* | 10/2005 | Brady et al. | 428/336 |
| 2006/0257713 A1* | 11/2006 | Elhamid et al. | 429/38 |
| 2007/0003815 A1* | 1/2007 | Vyas et al. | 429/38 |

OTHER PUBLICATIONS

"Pickling and Passivating Stainless Steel", The European Stainless Steel Development Association, Materials and Applications Series, vol. 4, 2007.*

"Electrical Conductivity: Measuring Salts in Water", Lake.access: an empact metro project, retrieved online on Oct. 2, 2010 from: http://www.lakeaccess.org/russ/conductivity.htm.*

"Titanium in medicine: material science, surface science, engineering, biological responses, and medical applications", Donald Maxwell Brunette, Springer, 2001. p. 244-246.*

"Corrosion Resistance for Research Reactor Fuel", Shaber et al., Idaho National Laboratory Reduced Enrichment Research Test Reactor Program, Jun. 2005. p. 1-16. Retrieved online on Mar. 27, 2013 from: http://www.inl.gov/technicalpublications/Documents/3028321.pdf.*

"Toray Carbon Paper TGP-H-060", retrieved online on Mar. 27, 2013 from: http://www.fuelcellstore.com/en/pc/viewPrd.asp?idproduct=564.*

Wang et al., "Surface modification and development of titanium bipolar plates for PEM fuel cells", Journal of Power Sources, vol. 160, Issue 1, Sep. 29, 2006, pp. 485-489.*

T.R. Ralph, "Proton Exchange Membrane Fuel Cells", Platinum Metals Review, vol. 41, No. 3, Jul. 1997, pp. 102-113.*

Devina Pillay and Michelle D. Johannes, "A First Principles Study of the Effects of Sulfur Adsorption on the Activity of Pt, Ni and Pt3Ni", AIChE, The 2007 Annual Meeting, Salt Lake City, UT, Nov. 5, 2007. Retrieved online on Jul. 3, 2013 from: https://aiche.confex.com/aiche/2007/techprogram/P85825.HTM.*

Supramaniam Srinivasan et al, Recent Advances in Solid Polymer Electrolyte Fuel Cell Technology With Low Platinum Loading Electrodes, pp. 1623-1629.

Indian Office Action dated Dec. 24, 2013; Applicant: GM Global Technology Operations LLC; Application No. 2213/KOL/2008; 2 pages.

* cited by examiner

PASSIVATED METALLIC BIPOLAR PLATES AND A METHOD FOR PRODUCING THE SAME

TECHNICAL FIELD

The field to which the disclosure generally relates includes fuel cells, fuel cell components, and methods of making and using the same.

BACKGROUND

A fuel cell is an electrochemical device that includes an anode and a cathode with an electrolyte therebetween. The anode receives hydrogen-rich gas or pure hydrogen and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode. The work may be used to operate a vehicle, for example.

Proton exchange membrane (PEM) fuel cells are popular for vehicle applications. The PEM fuel cell generally includes a solid-polymer-electrolyte proton-conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture, and the membrane define a membrane electrode assembly (MEA). MEAs are relatively expensive to manufacture and require certain conditions for effective operation. These conditions include proper water management and humidification, and control of catalyst poisoning constituents, such as carbon monoxide (CO).

Several fuel cells are typically combined in a fuel cell stack to generate the desired power. The fuel cell stack includes a series of flow field or bipolar plates positioned between the several MEAs in the stack. The bipolar plates include an anode side and a cathode side for adjacent fuel cells in the stack. The fuel cell stack receives an anode hydrogen reactant gas that flows into the anode side of the stack. Anode gas flow channels are provided on the anode side of the bipolar plates that allow the anode gas to flow to the anode side of the MEA. The fuel cell stack receives a cathode reactant gas, typically a flow of air forced through the stack by a compressor. Cathode gas flow channels are provided on the cathode side of the bipolar plates that allow the cathode gas to flow to the cathode side of the MEA. Not all of the oxygen is consumed by the stack and some of the air is output as a cathode exhaust gas that may include liquid water as a stack by-product. The bipolar plates may also include flow channels for a cooling fluid. An automotive fuel cell stack, for example, may include about two hundred or more bipolar plates.

The bipolar plates are typically made of a conductive material so that they conduct the electricity generated by the fuel cells from one cell to the next cell and out of the stack. Metal bipolar plates may produce a natural oxide on their outer surface that may make them resistant to corrosion. However, this oxide layer is not conductive, and thus increases the internal resistance of the fuel cell, reducing its electrical performance.

SUMMARY OF EXEMPLARY EMBODIMENTS OF THE INVENTION

One embodiment of the invention includes a method including providing a fuel cell substrate; treating the substrate to form a passive layer, wherein the passive layer has a thickness of at least 3 nm; and depositing an electrically conductive coating over the substrate, wherein the coating has a thickness of about 0.1 nm to about 50 nm.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF EXEMPLARY EMBODIMENTS

The following description of the embodiment(s) is merely exemplary in nature and is in no way intended to limit the invention, its application, or uses.

Figure 1:
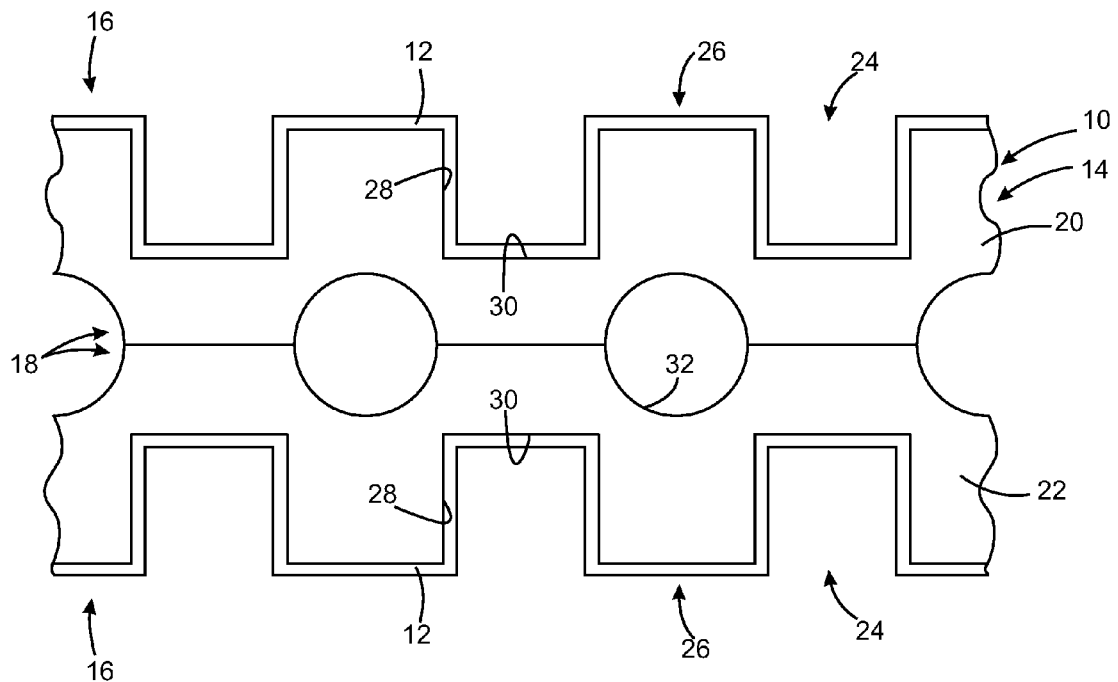
FIG. 1 illustrates a process according to one embodiment of the invention.

Referring to FIG. 1, in one embodiment a fuel cell substrate 10 is provided. The substrate may comprise at least one of stainless steel, titanium, aluminum, or nickel base alloy. The substrate 10 may be treated to form a passive layer 12. The treating of the substrate 10 may include at least one of contacting the substrate with a nitric acid solution, applying to the substrate a heat treatment above 400° C., or soaking the substrate in boiling de-ionized water. In one embodiment, the applying the to the substrate a heat treatment may include placing the substrate in an oven set above 400° C., for example 450° C. In one embodiment, the treating of the substrate 10 may remove any residual iron that resulted from mechanical treatments of the substrate, for example when the substrate is stainless steel. The passive layer 12 may be a passive oxide film that gives the substrate a high corrosion resistance. The passive layer 12 may make the surface of the substrate 10 less prone to attacks in corrosive environments, for example in a fuel cell environment. The passive oxide film may create significant contact resistance with a gas diffusion media.

In one embodiment, the thickness of the passive layer 12 may be about 0.5 nm to about 30 nm. In one embodiment, the thickness of the passive layer 12 may be about 3 nm to about 4 nm. In one embodiment, the passive layer 12 may be of a thickness such that the layer will not grow further after it is positioned in a fuel cell environment. In one embodiment, the thickness of the passive layer 12 may not increase subsequent to the treating of the substrate 10 to form the passive layer 12.

In one embodiment, the substrate 10 may be a bipolar plate 14. The bipolar plate 14 may have a first face 16 and a second face 18. The bipolar plate 14 may include two sheets 20 and 22. The two sheets 20 and 22 may be machined or stamped. The two sheets 20 and 22 may be welded together. A reactant gas flow field comprising flow channels 24 and lands 26 is defined in the first face 16. The channels 24 may be defined by sidewall(s) 28 and bottom wall 30. Cooling fluid flow channels 32 may be provided, for example but not limited to, over the second face 18.

Figure 2:
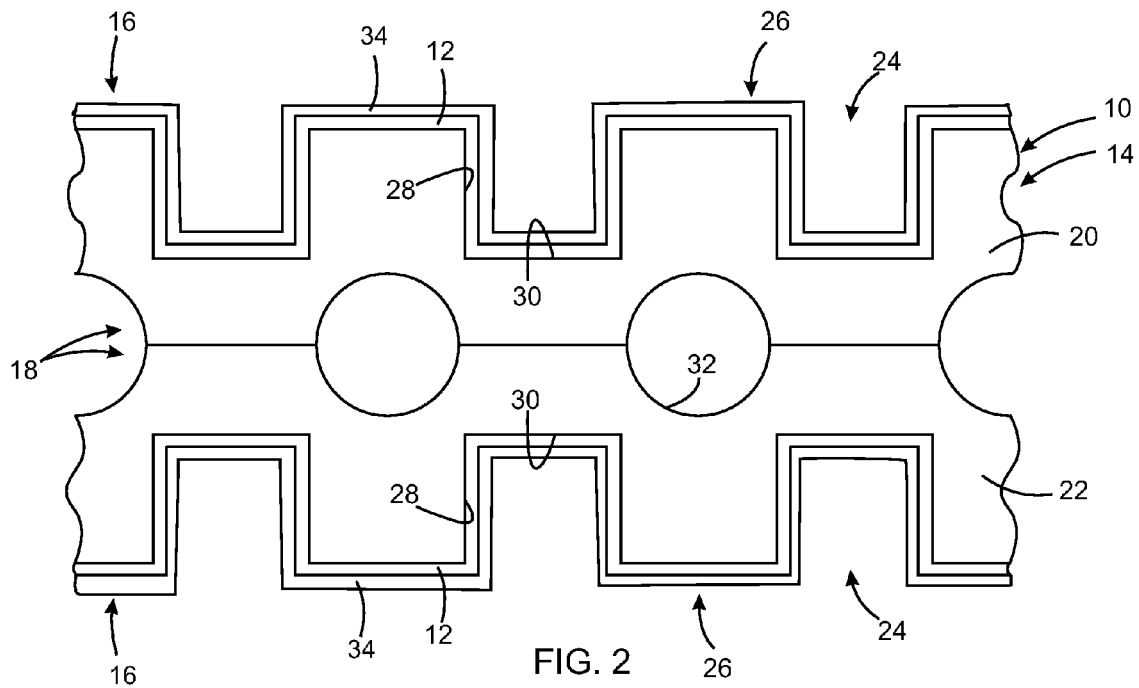
FIG. 2 illustrates a process according to one embodiment of the invention.

Referring to FIG. 2, one embodiment of the invention includes a method including depositing an electrically conductive coating 34 over the substrate 10 with the passive layer 12. The electrically conductive coating 34 may comprise at least one of gold, platinum, ruthenium, or iridium. The electrically conductive coating 34 may have a thickness of about 0.1 nm to about 50 nm. In one embodiment, the electrically conductive coating 34 may have a thickness of about 0.1 nm to about 2 nm. The depositing of the electrically conductive coating 34 may comprise at least one of physical vapor deposition methods, for example but not limited to, magnetron sputtering, electron beam evaporation, or ion assisted deposition. In one embodiment, the electrically conductive coating 34 is porous, but the contact resistance does not increase any further inside a corrosive environment, for example inside a fuel cell, because the passive layer 12 was pre-grown on the substrate 10 before applying the electrically conductive coating 34.

Figure 3:
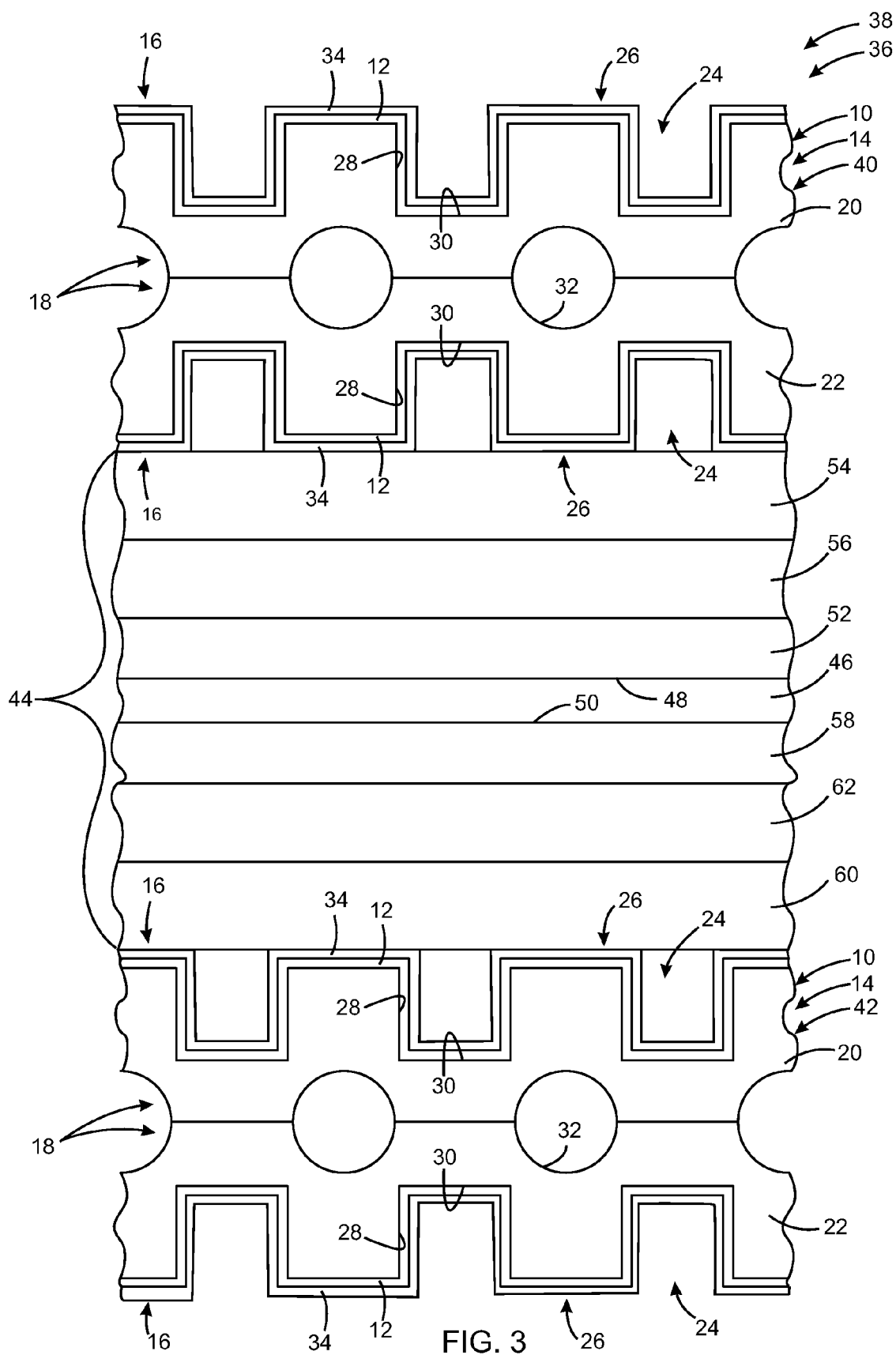
FIG. 3 illustrates a product according to one embodiment of the invention.

Referring to FIG. 3, one embodiment of the invention includes a product 36 comprising the substrate 10. The product 36 may be a fuel cell 38 and the substrate 10 may include at least one fuel cell bipolar plate 14. One embodiment of the invention includes a first fuel cell bipolar plate 40 and a second fuel cell bipolar plate 42. The bipolar plates 40, 42 each include a first face 16 having a reactant gas flow field defined therein by a plurality of lands 26 and channels 24. The bipolar plates 40, 42 may include a variety of materials including, but not limited to, a metal, a metal alloy, and/or an electrically conductive composite. In one embodiment, the bipolar plates 40, 42 may be stainless steel. In other embodiments, the bipolar plates 40, 42 may be one of titanium, aluminum, or polymeric carbon composites.

A soft goods portion 44 may be provided between the first bipolar plate 40 and the second bipolar plate 42. The soft goods portion 44 may include a polymer electrolyte membrane 46 comprising a first face 48 and a second face 50. A cathode electrode 52 may overlie the first face 48 of the polymer electrolyte membrane 46. A first gas diffusion media layer 54 may overlie the cathode electrode 52, and optionally a first microporous layer 56 may be interposed between the first gas diffusion media layer 54 and the cathode electrode 52. The first gas diffusion media layer 54 may be hydrophobic. The first bipolar plate 40 may overlie the first gas diffusion media layer 54.

An anode electrode 58 may underlie the second face 50 of the polymer electrolyte membrane 46. A second gas diffusion media layer 60 may underlie the anode electrode 58, and optionally a second microporous layer 62 may be interposed between the second gas diffusion media layer 60 and the anode electrode 58. The second gas diffusion media layer 60 may be hydrophobic. The second bipolar plate 42 may overlie the second gas diffusion media layer 60.

In various embodiments, the polymer electrolyte membrane 46 may comprise a variety of different types of membranes. The polymer electrolyte membrane 46 useful in various embodiments of the invention may be an ion-conductive material. Examples of suitable membranes are disclosed in U.S. Pat. Nos. 4,272,353 and 3,134,689, and in the Journal of Power Sources, Volume 28 (1990), pages 367-387. Such membranes are also known as ion exchange resin membranes. The resins include ionic groups in their polymeric structure; one ionic component for which is fixed or retained by the polymeric matrix and at least one other ionic component being a mobile replaceable ion electrostatically associated with the fixed component. The ability of the mobile ion to be replaced under appropriate conditions with other ions imparts ion exchange characteristics to these materials.

The ion exchange resins can be prepared by polymerizing a mixture of ingredients, one of which contains an ionic constituent. One broad class of cationic exchange, proton conductive resins is the so-called sulfonic acid cationic exchange resin. In the sulfonic acid membranes, the cationic exchange groups are sulfonic acid groups which are attached to the polymer backbone.

The formation of these ion exchange resins into membranes or chutes is well-known to those skilled in the art. The preferred type is perfluorinated sulfonic acid polymer electrolyte in which the entire membrane structure has ionic exchange characteristics. These membranes are commercially available, and a typical example of a commercial sulfonic perfluorocarbon proton conductive membrane is sold by E. I. DuPont D Nemours & Company under the trade designation NAFION. Other such membranes are available from Asahi Glass and Asahi Chemical Company. The use of other types of membranes, such as, but not limited to, perfluorinated cation-exchange membranes, hydrocarbon based cation-exchange membranes as well as anion-exchange membranes are also within the scope of the invention.

In one embodiment, the first gas diffusion media layer 54 or the second gas diffusion media layer 60 may include any electrically conductive porous material. In various embodiments, the gas diffusion media layer 54 or 60 may include non-woven carbon fiber paper or woven carbon cloth which may be treated with a hydrophobic material, such as, but not limited to, polymers of polyvinylidene fluoride (PVDF), fluoroethylene propylene, or polytetrafluoroethylene (PTFE). The gas diffusion media layer 54 or 60 may have an average pore size ranging from 5-40 micrometers. The gas diffusion media layer 54 or 60 may have a thickness ranging from about 100 to about 500 micrometers.

In one embodiment, the cathode electrode 52 and the anode electrode 58 (cathode layer and anode layer) may be catalyst layers which may include catalyst particles such as platinum, and an ion conductive material such as a proton conducting ionomer, intermingled with the particles. The proton conductive material may be an ionomer such as a perfluorinated sulfonic acid polymer. The catalyst materials may include metals such as platinum, palladium, and mixtures of metals such as platinum and molybdenum, platinum and cobalt, platinum and ruthenium, platinum and nickel, platinum and tin, other platinum transition-metal alloys, and other fuel cell electrocatalysts known in the art. The catalyst materials may be finely divided if desired. The catalyst materials may be unsupported or supported on a variety of materials such as but not limited to finely divided carbon particles.

In one embodiment, the first microporous layer 56 or the second microporous layer 62 may be made from materials such as carbon blacks and hydrophobic constituents such as polytetrafluoroethylene (PTFE) and polyvinylidene fluoride (PVDF), and may have a thickness ranging from about 2 to about 100 micrometers. In one embodiment the microporous layer 56 or 62 may include a plurality of particles, for example including graphitized carbon, and a binder. In one embodiment the binder may include a hydrophobic polymer such as, but not limited to, polyvinylidene fluoride (PVDF), fluoroethylene propylene (FEP), polytetrafluoroethylene (PTFE), or other organic or inorganic hydrophobic materials. The particles and binder may be included in a liquid phase which may be, for example, a mixture of an organic solvent and water to provide dispersion. In various embodiments, the solvent may include at least one of 2-propanol, 1-propanol or ethanol, etc. The dispersion may be applied to a fuel cell substrate, for example, but not limited to, a gas diffusion media layer. In another embodiment, the dispersion may be applied to an electrode. The dispersion may be dried (by evaporating the solvent) and the resulting dried microporous layer may include 60-90 weight percent particles and 10-40 weight percent binder. In various other embodiments, the binder may range from 10-30 weight percent of the dried microporous layer.

In one embodiment, the bipolar plates 40 and 42 may have a low contact resistance with the gas diffusion media and a high corrosion resistance in the fuel cell environment. In one embodiment, the fuel cell 38 may have a higher performance and durability. In one embodiment, the passive layer 12 and the electrically conductive coating 34 may contribute to better water management within the fuel cell 38. The water management may result from the electrically conductive coating being applied over a hydrophilic passive oxide film. Water management may be important because during operation of the fuel cell, moisture from the MEAs and external humidification may enter the anode and cathode flow channels. As the size of the water droplets increases, the flow channel is closed off, and the reactant gas is diverted to other flow channels because the channels flow in parallel between common inlet and outlet manifolds. Because the reactant gas may not flow through a channel that is blocked with water, the reactant gas cannot force the water out of the channel. Those areas of the membrane that do not receive reactant gas as a result of the channel being blocked will not generate electricity, thus resulting in a non-homogenous current distribution and reducing the overall efficiency of the fuel cell. As more and more flow channels are blocked by water, the electricity produced by the fuel cell decreases.

Figure 4:
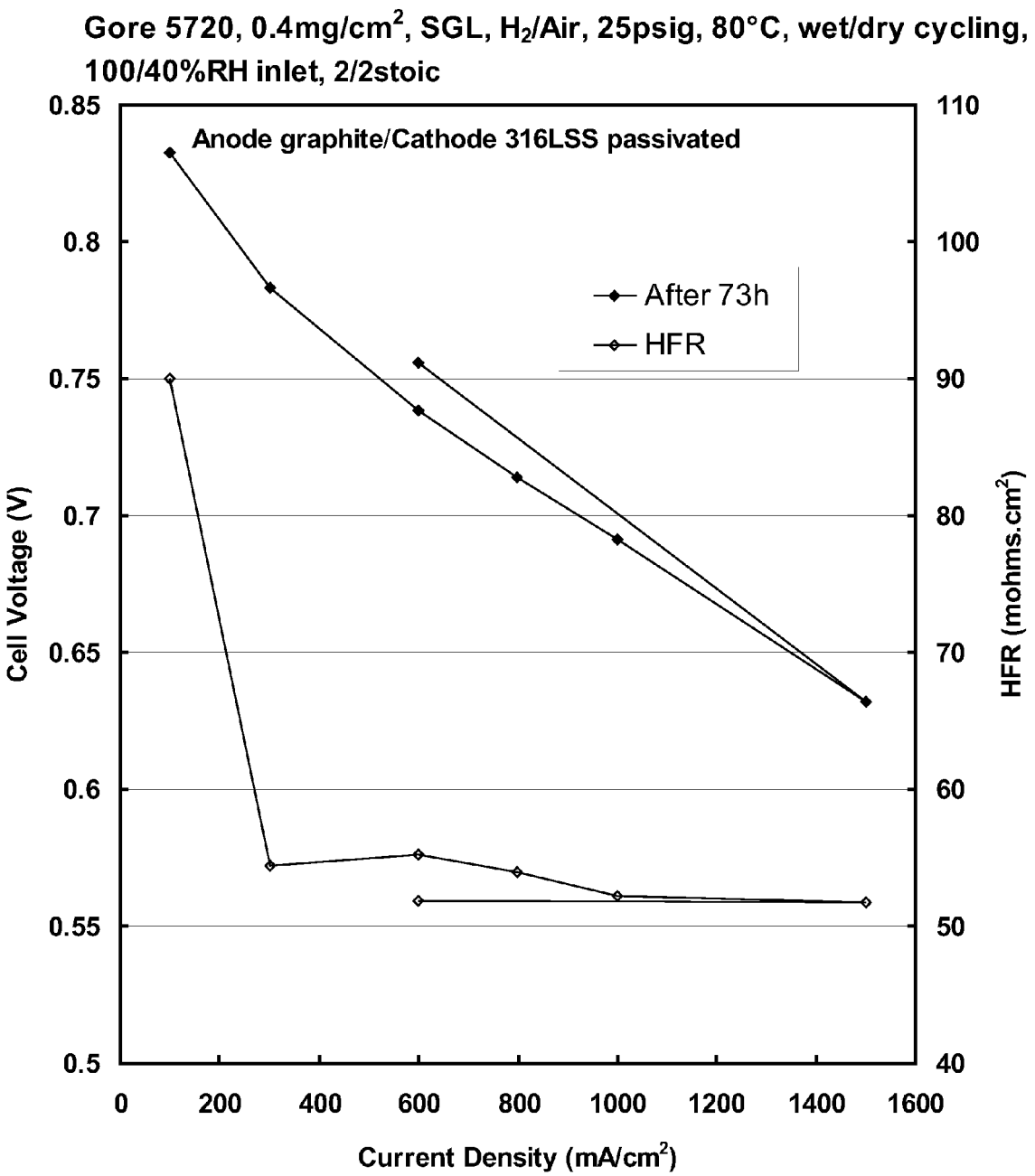
FIG. 4 is a graph illustrating cell voltage and high frequency resistance (HFR) versus current density.

Referring to FIG. 4, a graph is provided showing the cell voltage and high frequency resistance (HFR) versus current density. In this experiment a 316L stainless steel cathode plate was passivated in a nitric acid solution and then coated with 10 nm pVD gold on top of the passive film. A fuel cell was then assembled using this cathode plate and an anode graphite plate using a Gore 5720 MEA. The cell was run under cyclic conditions of relative humidity, and a steady state polarization curve was recorded. FIG. 4 shows a stable value of high frequency resistance of 53 mohm $cm^2$, which is almost identical to what is normally measured on gold coated stainless steel without the current passivation treatment. This was reflected on the fuel cell performance which showed a current density of 1500 mA/$cm^2$ at 0.63 V, which meets or even exceeds the target of 0.6 V at this current density to allow for fuel cell commercialization.

In one experiment, a 304L stainless steel sample was passivated in a nitric acid solution to remove any residual iron resulting from any mechanical treatments of the stainless steel. This resulted in a contact resistance of 115 mohm $cm^2$ "paper/sample" at 200 psi. Then a thin PVD gold layer was sputtered on top of this passivated surface and a contact resistance of 6-7 mohm $cm^2$ was achieved. This experiment shows that the resistance may be mainly due to the contact between the GDM and the passive film and not due to the bulk resistance of the passive film, which is insignificant.

In another experiment, a titanium coupon was polished using a 3M Scotch-Brite pad. The contact resistance on the polished titanium coupon was 7.5 mohm $cm^2$ "paper/sample" at 200 psi. The same titanium sample was passivated at +0.6V (Ag/AgCl) in an aerated 0.1 ppm HF solution of pH=3 at 80° C. The contact resistance was measured on this sample after the cathode side experiment and a value of 300 mohm $cm^2$ was measured. Then a thin PVD layer of gold was sputtered on the passivated titanium coupon and the contact resistance was measured to be 7 mohm $cm^2$.

In one embodiment, the corrosion resistance of the stainless steel may be retained through the build up of a coherent passive film on its surface which can be done in the steel mill, which upon depositing a conductive layer, for example a thin layer of Au, would reduce the contact resistance on the surface of the stainless steel.

When the terms "over", "overlying", "overlies", or "under", "underlying", "underlies" are used with respect to the relative position of a first component or layer with respect to a second component or layer, such shall mean that the first component or layer is in direct contact with the second component or layer, or that additional layers or components are interposed between the first component or layer and the second component or layer.

The above description of embodiments of the invention is merely exemplary in nature and, thus, variations thereof are not to be regarded as a departure from the spirit and scope of the invention.

What is claimed is:

1. A method comprising:
    providing a first fuel cell bipolar plate substrate having a reactant gas flow field defined in a surface;
    treating the first substrate to form a passive oxide layer on the substrate with a thickness of at least 3 nm, wherein the treating comprises at least one of soaking the substrate in boiling de-ionized water, or applying to the substrate a heat treatment above 400° C.;
    depositing an electrically conductive metal coating on the passive oxide layer on the substrate, wherein the coating has a thickness of about 0.1 nm to about 50 nm.

2. A method as set forth in claim 1 wherein the treating the first substrate further comprises removing residual iron from the first substrate.

3. A method as set forth in claim 1 wherein the depositing comprises at least one of magnetron sputtering, electron beam evaporation, or ion assisted deposition.

4. A method as set forth in claim 1 wherein the passive layer has a thickness such that the thickness will not increase subsequent to the treating of the first substrate to form the passive layer when used in a fuel cell.

5. A method as set forth in claim 1 wherein the electrically conductive metal coating comprises at least one of platinum, ruthenium, or iridium.

6. A method as set forth in claim 1 wherein the first substrate comprises at least one of stainless steel, titanium, aluminum, or nickel base alloy.

7. A method as set forth in claim 1 wherein the first substrate comprises a bipolar plate.

8. A method as set forth in claim 1 wherein the electrically conductive metal coating has a thickness of about 0.1 nm to about 2 nm.

9. A method as set forth in claim 1 further comprising:
    providing a second fuel cell substrate, wherein the first fuel cell substrate comprises a first bipolar plate and wherein the second fuel cell substrate comprises a second bipolar plate;
    providing a soft goods portion comprising a polymer electrolyte membrane comprising a first face and a second face, a cathode electrode overlying the first face of the polymer electrolyte membrane, a first gas diffusion media layer overlying the cathode electrode, an anode electrode underlying the second face of the polymer electrolyte membrane, and a second gas diffusion media layer underlying the anode electrode; and wherein the first bipolar plate overlies the first gas diffusion media layer, and the second bipolar plate underlies the second gas diffusion media layer.

10. A method as set forth in claim 9 further comprising providing a first microporous layer between the first gas diffusion media layer and the cathode electrode.

11. A method as set forth in claim 9 further comprising providing a second microporous layer between the second gas diffusion media layer and the anode electrode.

12. A method as set forth in claim 1 wherein the electrically conductive metal coating consists essentially of platinum, ruthenium, or iridium.

13. A method as set forth in claim 1 wherein the electrically conductive metal coating is porous.

14. A method as set forth in claim 9 wherein one of the first gas diffusion media layer and the second gas diffusion media layer includes a woven carbon cloth treated with a hydrophobic material.

15. A method as set forth in claim 9 wherein one of the first gas diffusion media layer and the second gas diffusion media layer has an average pore size of between 5 and 40 micrometers.

16. A method as set forth in claim 9 wherein one of the first gas diffusion media layer and the second gas diffusion media layer has an thickness of between 100 and 500 micrometers.

17. A method as set forth in claim 10 wherein the first microporous layer comprises a plurality of particles and a binder, wherein the binder and the plurality of particles are in a liquid phase comprising a mixture of organic solvent and water.

18. A method as set forth in claim 17 wherein the first microporous layer is dried and results in the first microporous layer comprising 60-90 weight percent particles and 10-40 weight percent binder.

19. A product comprising:
a first fuel cell bipolar plate substrate having a reactant gas flow field defined in a surface comprising a passive oxide layer thereon, wherein the passive layer has a thickness of at least 3 nm; and
a porous electrically conductive metal coating with the proviso that the electrically conductive metal coating does not include gold or platinum or vanadium on the passive oxide layer on the substrate, wherein the coating has a thickness of about 0.1 nm to about 50 nm.

20. A product as set forth in claim 19 wherein the electrically conductive metal coating comprises at least one of ruthenium, or iridium.

21. A product as set forth in claim 19 wherein the substrate comprises at least one of stainless steel, titanium, aluminum, or nickel base alloy.

22. A product as set forth in claim 19 wherein the electrically conductive metal coating has a thickness of about 0.1 nm to about 2 nm.

23. A product as set forth in claim 19 wherein the first fuel cell substrate comprises a first bipolar plate.

24. A product as set forth in claim 19 further comprising:
a second fuel cell substrate, wherein the first fuel cell substrate comprises a first bipolar plate and the second fuel cell substrate comprises a second bipolar plate;
a soft goods portion comprising a polymer electrolyte membrane comprising a first face and a second face, a cathode electrode overlying the first face of the polymer electrolyte membrane, a first gas diffusion media layer overlying the cathode electrode, an anode electrode underlying the second face of the polymer electrolyte membrane, and a second gas diffusion media layer underlying the anode electrode;

wherein the first bipolar plate overlies the first gas diffusion media layer, and the second bipolar plate underlies the second gas diffusion media layer.

25. A product as set forth in claim 24 further comprising a first microporous layer between the first gas diffusion media layer and the cathode electrode.

26. A product as set forth in claim 24 further comprising a second microporous layer between the second gas diffusion media layer and the anode electrode.

27. A product as set forth in claim 19 wherein the electrically conductive metal coating comprises at least one of ruthenium or iridium; wherein the substrate comprises at least one of stainless steel, titanium, aluminum, or nickel base alloy; and wherein the electrically conductive coating has a thickness of about 0.1 nm to about 2 nm.

28. A product as set forth in claim 19 wherein the electrically conductive metal coating consists essentially of ruthenium, or iridium.

29. A product as set forth in claim 25 wherein the first microporous layer comprises a plurality of particles and a binder, wherein the binder and the plurality of particles are in a liquid phase comprising a mixture of organic solvent and water.

30. A product as set forth in claim 29 wherein the first microporous layer is dried and results in the first microporous layer comprising 60-90 weight percent particles and 10-40 weight percent binder.

31. A method comprising:
providing a first fuel cell bipolar plate substrate having a reactant gas flow field defined in a surface;
treating the substrate to form a passive oxide layer on the substrate with a thickness of at least 3 nm, wherein the treating comprises contacting the substrate with a nitric acid solution;
depositing an electrically conductive metal coating with the proviso that the electrically conductive metal coating does not include gold or platinum or vanadium on the passive oxide layer on the substrate, wherein the coating has a thickness of about 0.1 nm to about 50 nm.

32. A method comprising:
providing a first fuel cell bipolar plate substrate having a reactant gas flow field defined in a surface;
treating the substrate to form a passive oxide layer on the substrate with a thickness of at least 3 nm, wherein the treating comprises soaking the substrate in boiling deionized water;
depositing an electrically conductive metal coating on the passive oxide layer on the substrate, wherein the coating has a thickness of about 0.1 nm to about 50 nm.

33. A method comprising:
providing a first fuel cell bipolar plate substrate having a reactant gas flow field defined in a surface;
treating the first substrate to form a passive oxide layer on the substrate with a thickness of at least 3 nm, wherein the treating comprises applying to the substrate a heat treatment above 400° C.;
depositing an electrically conductive metal coating on the passive oxide layer on the substrate, wherein the coating has a thickness of about 0.1 nm to about 50 nm.

34. A method comprising:
providing a first fuel cell bipolar plate substrate having a reactant gas flow field defined in a surface;

treating the first substrate to form a passive oxide layer on the substrate with a thickness of at least 3 nm, wherein the treating comprises at least one of contacting the substrate with a nitric acid solution, soaking the substrate in boiling de-ionized water, or applying to the substrate a heat treatment above 400° C.;

depositing an electrically conductive metal coating with the proviso that the electrically conductive metal coating does not include gold or platinum or vanadium on the passive oxide layer on the substrate, wherein the coating has a thickness of about 0.1 nm to about 50 nm.

* * * * *